(12) United States Patent
Chhokra et al.

(10) Patent No.: US 10,802,157 B2
(45) Date of Patent: Oct. 13, 2020

(54) THREE-DIMENSIONAL CITY MODELS AND SHADOW MAPPING TO IMPROVE ALTITUDE FIXES IN URBAN ENVIRONMENTS

(71) Applicant: Apple Inc., Cupertino, CA (US)

(72) Inventors: Kumar Gaurav Chhokra, San Jose, CA (US); Glenn Donald MacGougan, San Jose, CA (US); Robert Mayor, Half Moon Bay, CA (US)

(73) Assignee: Apple Inc., Cupertino, CA (US)

( * ) Notice: Subject to any disclaimer, the term of this patent is extended or adjusted under 35 U.S.C. 154(b) by 274 days.

(21) Appl. No.: 15/719,470

(22) Filed: Sep. 28, 2017

(65) Prior Publication Data

US 2019/0094379 A1 Mar. 28, 2019

(51) Int. Cl.
| | |
|---|---|
| *G01S 19/28* | (2010.01) |
| *G01S 19/40* | (2010.01) |
| *G01S 19/45* | (2010.01) |
| *G01S 19/42* | (2010.01) |
| *G01S 19/22* | (2010.01) |

(52) U.S. Cl.
CPC .............. *G01S 19/28* (2013.01); *G01S 19/40* (2013.01); *G01S 19/42* (2013.01); *G01S 19/45* (2013.01); *G01S 19/22* (2013.01)

(58) Field of Classification Search
CPC .......... G01S 19/21; G01S 19/22; G01S 19/23; G01S 19/235; G01S 19/40; G01S 19/42
See application file for complete search history.

(56) References Cited

U.S. PATENT DOCUMENTS

| | | | |
|---|---|---|---|
| 6,590,530 | B2 | 7/2003 | van Diggelen et al. |
| 6,614,386 | B1 | 9/2003 | Moore et al. |
| 6,640,189 | B2 | 10/2003 | Perlmutter et al. |
| 7,647,171 | B2 | 1/2010 | Horvitz et al. |
| 7,907,088 | B2 | 3/2011 | Terashima |

(Continued)

OTHER PUBLICATIONS

"Urban Localization and 3D Mapping using GNSS Shadows," Inside GNSS, Sep./Oct. 2015, pp. 60-66.

(Continued)

*Primary Examiner* — Marc Anthony Armand
(74) *Attorney, Agent, or Firm* — Jaffery Watson Mendonsa & Hamilton LLP

(57) ABSTRACT

The disclosed embodiments use 3D city models and shadow mapping to improve altitude fixes in urban environments. In an embodiment, a method comprises: generating a set of three-dimensional (3D) candidate positions in a geographic area of interest; predicting global navigation satellite system (GNSS) signal visibility at selected ones of the 3D candidate positions; receiving GNSS signals at a current location of the mobile device; determining observed satellite visibility based on the received GNSS signals; comparing the predicted satellite visibility with the observed satellite visibility; determining a position fix based on a result of the comparing; determining an indoor environment where the mobile device is located based at least on an altitude component of the position fix; obtaining structural data for the identified indoor environment; and determining a floor lower bound for the current location of the mobile device based on the altitude component and the structural data.

18 Claims, 6 Drawing Sheets

(56) References Cited

U.S. PATENT DOCUMENTS

| | | |
|---|---|---|
| 9,068,839 B2 | 6/2015 | Mattila |
| 9,125,019 B1 | 9/2015 | Heikkila |
| 9,237,417 B2 | 1/2016 | Marshall et al. |
| 9,374,671 B1* | 6/2016 | Zhyshko ............... H04W 4/029 |
| 9,408,175 B2 | 8/2016 | MacGougan et al. |
| 9,448,307 B2 | 9/2016 | Ben-Moshe et al. |
| 9,681,269 B2 | 6/2017 | MacGougan et al. |
| 2009/0210156 A1 | 8/2009 | Riley et al. |
| 2013/0095849 A1 | 4/2013 | Pakzad |
| 2013/0271324 A1 | 10/2013 | Sendonaris et al. |
| 2013/0278465 A1 | 10/2013 | Owen |
| 2013/0324154 A1 | 12/2013 | Raghupathy et al. |
| 2014/0016115 A1 | 1/2014 | Shimon et al. |
| 2014/0375494 A1 | 12/2014 | Fleming et al. |
| 2015/0032370 A1 | 1/2015 | Garin |
| 2015/0094089 A1* | 4/2015 | Moeglein ............... G01S 5/16 455/456.1 |
| 2015/0249907 A1* | 9/2015 | Gupta .................... H04W 4/02 455/456.1 |
| 2016/0327654 A1 | 11/2016 | Kumabe et al. |
| 2017/0068001 A1 | 3/2017 | Chhokra et al. |

OTHER PUBLICATIONS

Wang et al., "GNSS Shadow Matching: Improving Urban Positioning Accuracy Using a 3D City Model with Optimized Visibility Scoring Scheme," Navigation: Journal of the Institute of Navigation, Revised Mar. 2013, pp. 195-207.

Notice of Allowance for U.S. Appl. No. 14/503,046 dated Mar. 28, 2016, 12 pages.

Supplemental Notice of Allowance for U.S. Appl. No. 14/503,046 dated Jun. 13, 2016, 2 pages.

Groves et al., "Enhancing Micro Air Vehicle Navigation in Dense Urban Areas using 3D Mapping Aided GNSS." Institute of Navigation, Sep. 27, 2017, pp. 2994-3009.

Groves et al., "GNSS shadow matching: The challenges ahead." The Institute of Navigation, Sep. 18, 2015, pp. 2421-2443.

International Search Report and Written Opinion in International Application No. PCT/US2018/052441, dated Dec. 4, 2018, 15 pages.

Yozevitch et al., "A robust shadow matching algorithm for GNSS positioning." Navigation: Journal of The Institute of Navigation, Sep. 2015, 62(2):95-109.

PCT International Preliminary Report on Patentability in International Appln. No. PCT/US2018/052441, dated Apr. 4, 2020, 9 pages.

* cited by examiner

THREE-DIMENSIONAL CITY MODELS AND SHADOW MAPPING TO IMPROVE ALTITUDE FIXES IN URBAN ENVIRONMENTS

TECHNICAL FIELD

This disclosure relates generally to location determination using radio signals.

BACKGROUND

Many mobile devices, such as smart phones, tablet computers and wearable devices (e.g., smart watches), have navigation applications that depend on global navigation satellite system (GNSS) signals. In challenging GNSS signal environments, such as an "urban canyon" with its tall buildings and narrow streets, mobile devices may perform poorly in terms of position accuracy and solution availability. The poor performance is exacerbated in the across-street direction and altitude because line-of-sight (LOS) GNSS signals are more likely to be blocked by a building or other tall structures.

SUMMARY

The disclosed embodiments use 3D city maps and shadow mapping to improve altitude fixes in urban environments.

In an embodiment, a method comprises: generating, by a processor of a mobile device, a set of three-dimensional (3D) candidate positions in a geographic area of interest; predicting, by the processor, global navigation satellite system (GNSS) signal visibility at selected ones of the 3D candidate positions; receiving, by a GNSS receiver of the mobile device, GNSS signals at a current location of the mobile device; determining, by the processor, observed satellite visibility based on the received GNSS signals; comparing the predicted satellite visibility with the observed satellite visibility; determining, by the processor, a position fix based on a result of the comparing; determining, by the processor, an indoor environment where the mobile device is located based at least on an altitude component of the position fix; obtaining, by the processor, structural data for the identified indoor environment; and determining, by the processor, a floor lower bound for the current location of the mobile device based on the altitude component and the structural data.

In an embodiment, a system comprises: one or more processors; memory coupled to the one or more processors and configured to store instructions, which, when executed by the one or more processors, cause the one or more processors to perform operations comprising: generating a set of three-dimensional (3D) candidate positions in a geographic area of interest; predicting global navigation satellite system (GNSS) signal visibility at selected ones of the 3D candidate positions; receiving GNSS signals at a current location of a mobile device; determining observed satellite visibility based on the received GNSS signals; comparing the predicted satellite visibility with the observed satellite visibility; determining a position fix based on a result of the comparing; determining an indoor environment where the mobile device is located based at least on an altitude component of the position fix; obtaining structural data for the identified indoor environment; and determining a floor lower bound for the current location of the mobile device based on the altitude component and the structural data.

Other embodiments include an apparatus, mobile device and non-transitory, computer-readable storage medium.

The details of one or more implementations of the subject matter are set forth in the accompanying drawings and the description below. Other features, aspects and advantages of the subject matter will become apparent from the description, the drawings and the claims.

DETAILED DESCRIPTION

Example GNSS Signal Environment

Figure 1:
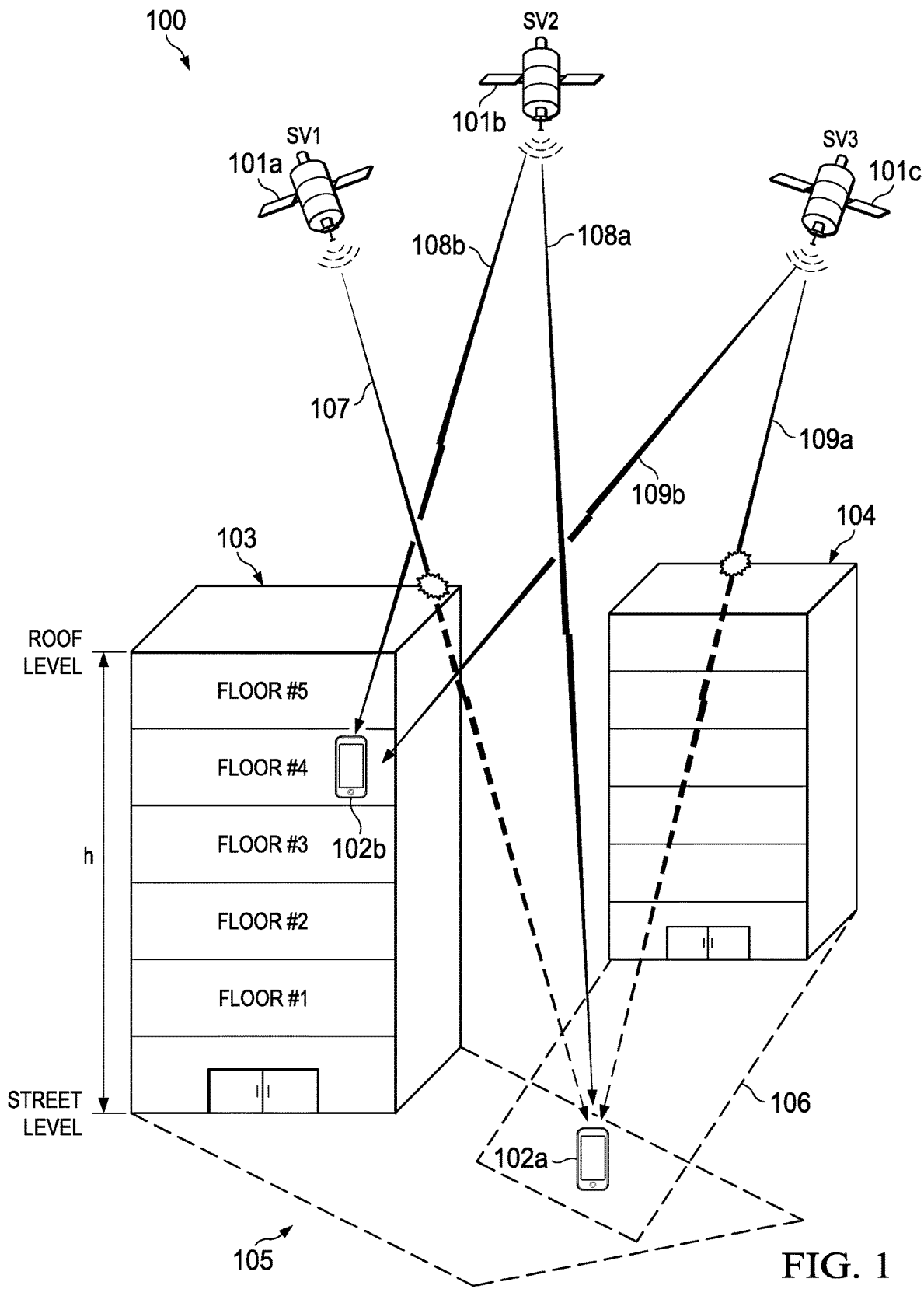
FIG. 1 illustrates an example GNSS signal environment where 3D city models and shadow mapping are used to improve altitude fixes in urban environments, according to an embodiment.

FIG. 1 illustrates an example GNSS signal environment 100 where 3D city models and shadow mapping are used to improve altitude fixes in an urban environment, according to an embodiment. Due to obstruction by tall structures (e.g., buildings) in urban canyons, signals from GNSS satellites will be observable at some locations on a street but not at other locations on the street. The locations where each LOS signal from a satellite is observable can be predicted using a 3D city model. By determining whether a LOS signal is being received from a given satellite, the user can determine their position to within one of two areas of the street. By considering other satellites, the position solution may be further refined. At each epoch, a set of candidate user positions is generated close to the user's initial GNSS positioning solution. At each candidate user position, the predicted satellite visibility is matched with the real observations. The candidate position that has the best match between the prediction and the real observations is the shadow matching positioning solution.

GNSS signal environment 100 includes GNSS satellites 101a-101c (SV1, SV2, SV3), mobile devices 102a, 102b and buildings 103, 104. Mobile device 102a is located on a street in front of buildings 103, 104, and mobile device 102b is located on the 4th floor of building 103. Some examples of GNSS include, but are not limited to: Global Positioning System (GPS), GLONASS, Galileo and Beidou. Although FIG. 1 shows three satellites 101a-101c, a GNSS satellite constellation can have significantly more satellites (e.g., 24-32 satellites), and the number of satellites that are observable at any given location on earth at any given time can be different.

Building 103 is a five-story building that is associated with shadow 105 and building 104 is a five-story building that is associated with shadow 106. GNSS signal 107 transmitted by satellite 101a is blocked by building 103, and therefore cannot be received by mobile device 102a at any location within shadow 105. This blockage is shown in FIG. 1 as a dashed line. Similarly, GNSS signal 109a transmitted by satellite 101c is blocked by building 104 and therefore cannot be received by mobile device 102a at any location within shadow 106. In the example, shown, satellite 101b is located directly overhead mobile device 102a and its GNSS signal 108a is not blocked by buildings 103, 104. Accordingly, in this example scenario there is no shadow map for satellite 101b. Locations outside shadows 105, 106 can see GNSS signals from all three GNSS satellites 101a-101c. The size and direction of shadows 105, 106 will change throughout the day and night as the earth rotates and satellites 101a-101c move in their respective earth orbits. It is noted that mobile device 102a may observe or receive NLOS GNSS signals, which are diffracted or reflected off surfaces of buildings and other objects in GNSS signal environment 100.

The location of mobile device 102a can be estimated precisely using GNSS signals if observable. A GNSS signal is "observable" if its signal-to-noise ratio (SNR) is within a specified range (e.g., 25-55 dB-Hz). To get a good outdoor GNSS position fix it is desirable for a GNSS receiver in mobile device 102a to receive at least four GNSS signals from four GNSS satellites having good geometry as quantified with, for example, a dilution of precision (DOP) metric. In this example, we assume that GNSS signals 108b, 109b (albeit weaker) can still be received by mobile device 102b when operating on the fourth floor of building 103. For example, mobile device 102b may be operating close to a window, or in an open-air atrium, terrace or balcony. If the GNSS signals 108b, 109b are insufficient to get a position fix, other positioning technologies can be used, including for example dead reckoning (e.g., equations of motion) using a previous GNSS position fix and inertial sensors (e.g., accelerometer, gyro, magnetometer). Alternatively, signals received from access points of a wireless network or cell towers of a cellular network can be used to estimate position, including trilateration, time of flight (TOF) or time-of-arrival (TOA), Bayes inference techniques using received signal strength indicators, k-weighted neighbors, particle filters and shadow matching. All of these positioning technologies have difficulty providing consistently accurate position fixes in urban environments that have significant multipath effects.

Conventional shadow matching solutions are designed to refine a GNSS position solution obtained from LOS and NLOS GNSS signals (e.g., diffracted or reflected GNSS signals). For example, using 3D building models taken from a 3D city model, a GNSS receiver can determine its location by matching observed GNSS signals with predicted GNSS signals derived from ephemeris data received in the GNSS signals. Because conventional shadow matching solutions are not designed to work with indoor positioning methods, and because such methods rely on 2D shadow maps where satellite observations are made from an assumed user location at street level, these methods cannot distinguish between a street level position fix of mobile device 102a and an elevated position fix of mobile device 102b.

At a given street level location, it may be the case that fewer GNSS signals are observed than were theoretically predicted to be observable. As described in more detail below, in an embodiment, a satellite is predicted to be observable at a particular position fix and particular azimuth angle, if the satellite elevation angle is greater than a building boundary elevation angle for the same azimuth (See FIGS. 3C and 4). The building boundary elevation angle is also referred to herein as an elevation mask angle. One reason for this discrepancy between predicted satellite visibility and actual satellite visibility is that the mobile device may be operating at a higher altitude at the same position fix. In such a scenario, one can reasonably infer that the mobile device is operating indoors (e.g., in a building where no or weak GNSS signals are received). Once this inference is made, a map or 3D building model can be evaluated to determine one or more candidate indoor environments that are proximate to the position fix and that have a height that is equal to or exceeds the altitude where the satellite(s) becomes observable, which is referred to herein as an altitude estimate. In an embodiment, where the mobile device includes an altitude sensor such as a barometer, the altitude estimate can be used to calibrate the barometer data (e.g., remove the offset error). The calibrated barometer data can then be used to improve position fixes. For example, the calibrated barometer measurement can be included in an observation vector by a Kalman filter or other state estimator to improve position and velocity measurements. In an embodiment, the barometer bias can be one of the estimated states. In another embodiment, the altitude estimate can be used as an observation in the state estimator or filter to improve altitude estimates.

Other information can be used to select a single candidate indoor environment (e.g., a single building) as being the most likely operating location of the mobile device. For example, the building that is nearest to the improved position fix can be selected as the indoor environment where the mobile device is most likely located. If there are two or more candidate buildings that are about the same distance from the position fix, the candidate buildings can be scored based on, for example, a sum of weighted factors. An example factor can be whether the candidate building is associated with the mobile device or the user of the mobile device. For example, the mobile device may cache a history of frequented locations by the user, which can be used to adjust the score. If the candidate building is a frequented location by the user, the weight of this factor can be higher. Another example factor can be based on pedestrian dead reckoning (PDR).

After the indoor environment is identified, structural data for the indoor environment (e.g., a floor plan, building blueprints, 3D building data, point-of-interest (POI) data) can be evaluated to determine a floor lower bound (LB). The floor LB is the lowest floor or level in the indoor environment where the mobile device may be operating. The floor LB can be added to a map of a navigation or tracking application, or provided to an enhanced-911 (E911) dispatch center to assist first responders in finding a more precise location of an emergency.

In addition to finding a floor LB, the altitude estimate can be used to calibrate a barometer sensor of the mobile device to account for instantaneous bias and atmospheric conditions. In an embodiment, the altitude estimate can be used as an additional observation in a location estimator (e.g., Kalman filter, particle filter) to improve an estimate of position and velocity and other states of the mobile device (e.g., estimate barometer sensor bias). One or more access points can be tagged as including improved altitude estimates which can be used in subsequent position fixes.

Example System

Figure 2:
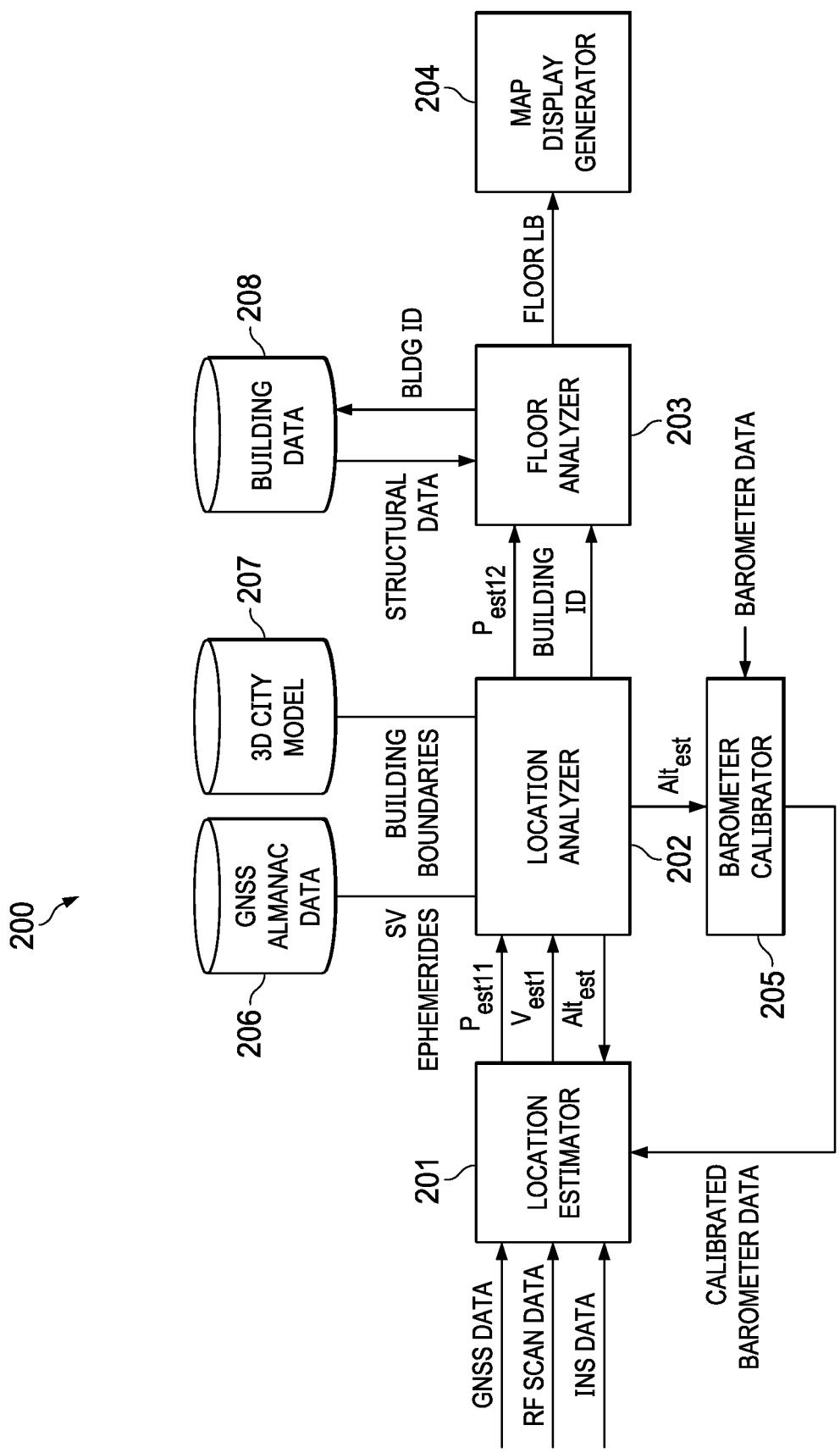
FIG. 2 is a block diagram of an example system for using 3D city models and shadow mapping to improve altitude fixes in urban environments, according to an embodiment.

FIG. 2 is a block diagram of an example system 200 for using 3D city models and shadow mapping to improve altitude fixes in urban environments, according to an embodiment. System 200 includes location estimator 201, location analyzer 202, floor analyzer 203, map display generator 204 and barometer calibrator 205. Location analyzer 202 is coupled to GNSS almanac database 206 and 3D city model database 207. Floor analyzer 203 is coupled to building data database 208.

Location estimator 201 receives as input GNSS data, wireless scan data, inertial navigation sensor (INS) data and barometric sensor data. GNSS data can include time stamped position and velocity data (PVT) in a geodetic coordinate frame (e.g., latitude, longitude, altitude) or a Cartesian local-level coordinate system, such as East-North-Up (ENU). GNSS data can also include satellite ephemerides, which can be used to determine the azimuth and elevation of satellites in the geodetic or local-level coordinate system. Wireless scan data can include received signal strength indicators (RSSIs) calculated from signals transmitted by wireless access points (APs) and unique identifiers (e.g., MAC addresses) for the APs. INS data can be any data provided by an INS, including but not limited to accelerometers, gyros and magnetometers. In an embodiment, location estimator 201 receives calibrated barometer sensor data from barometer calibrator 205.

Location estimator 201 can include a state estimator or filter, such as a Kalman filter, least squares estimator or particle filter. The state estimator or filter uses sensor fusion to estimate three dimensions of position and velocity and possibly other states (e.g., sensor bias). In an embodiment, location estimator 201 can predict the position and velocity of the mobile device and then use an observation vector that includes data from one or more of the sensors and/or barometer sensor data to correct the prediction, while taking into account process noise and measurement noise. In an embodiment, location estimator 201 can include different state estimators or filters for outdoor and indoor navigation. For example, location estimator 201 can use probabilistic methods, such Wi-Fi fingerprints, Bayes inference and a database of AP locations to estimate the position and velocity of a mobile device in an indoor environment, and cell tower trilateration and/or GNSS signals to estimate the position and velocity of the mobile device in an outdoor environment.

Location analyzer 202 takes as input an initial position fix $P_{est1}$ and its associated uncertainty value generated by location estimator 201. Location analyzer 202 can use the initial position fix and its associated uncertainty value to define a 2D candidate position grid (CPG), as described in reference to FIG. 3A. In an embodiment, the footprint of the 2D CPG can span a circular region with the initial position fix as the center, and the size of the circular region represents the amount of uncertainty of the initial position fix. For example, a larger circular region corresponds to a larger uncertainty and vice-versa. The actual position of the mobile device can be anywhere within the circular region. In another embodiment, the footprint of the 2D CPG can be a square rectangle or any other shape.

In an embodiment, knowledge of satellite geometry can be used to determine the location and footprint of the 2D CPG. The candidate positions in the 2D CPG can be spaced-apart by a specified distance (e.g., 2 or 3-meter spacing) based on the desired accuracy of the position fix. Additionally, the number and spacing of candidate positions might vary along-street from those across-street.

Example 3D Candidate Position Grid (CPG)

Figure 3B:
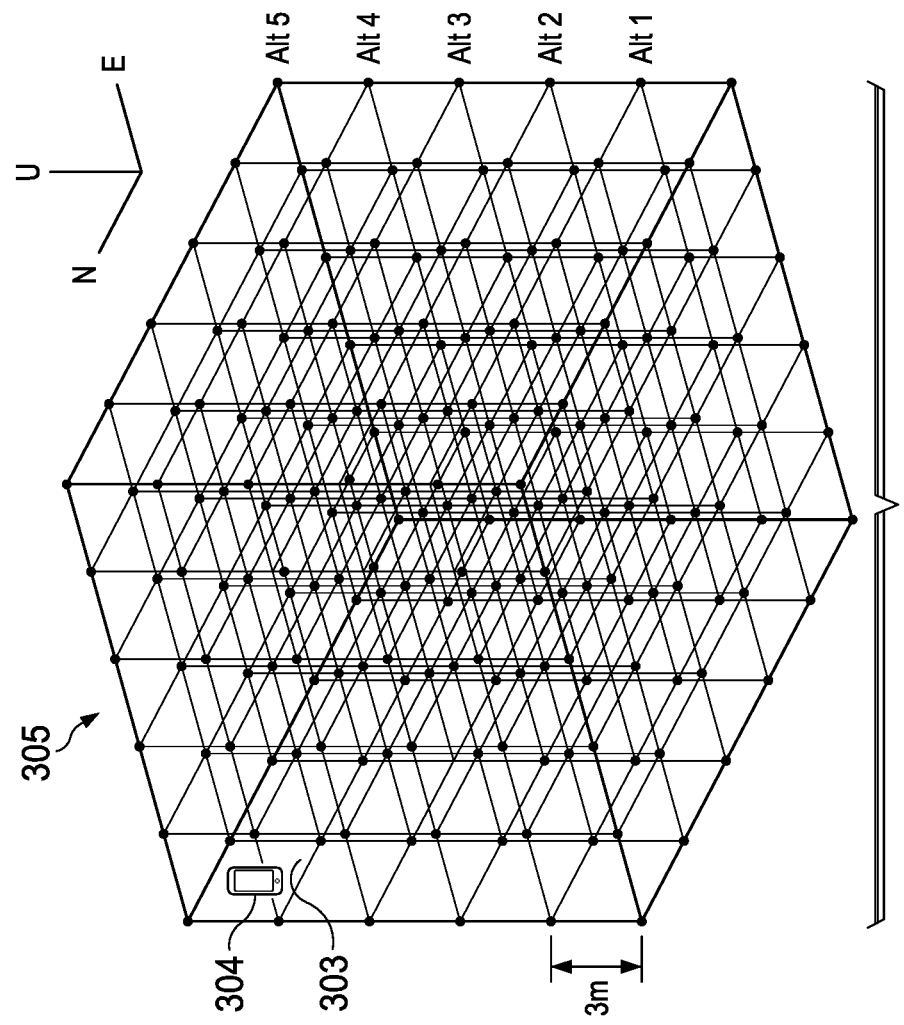
FIG. 3B is a perspective view of the example 3D candidate position grid, according to an embodiment.

Once the 2D CPG is generated all or some of the 2D CPG is extended vertically to create a multi-layer, 3D CPG, as shown in FIG. 3B. The vertical spacing between layers in the 3D CPG can be equidistant or non-equidistant and the same or different than the horizontal spacing (e.g., 2-3 meters). In an embodiment, the number of layers and vertical spacing between layers can be based on the tallest building in the area. The footprint of the 3D CPG can be varied based on an assessment of the quality of the received GNSS signals. For example, to reduce computations, all of the candidate positions in the 2D CPG need not be extended in the vertical direction. Rather, certain candidate positions can be selected for vertical extension based on satellite geometry and proximity of the candidate position to a candidate indoor environment.

Figure 3A:
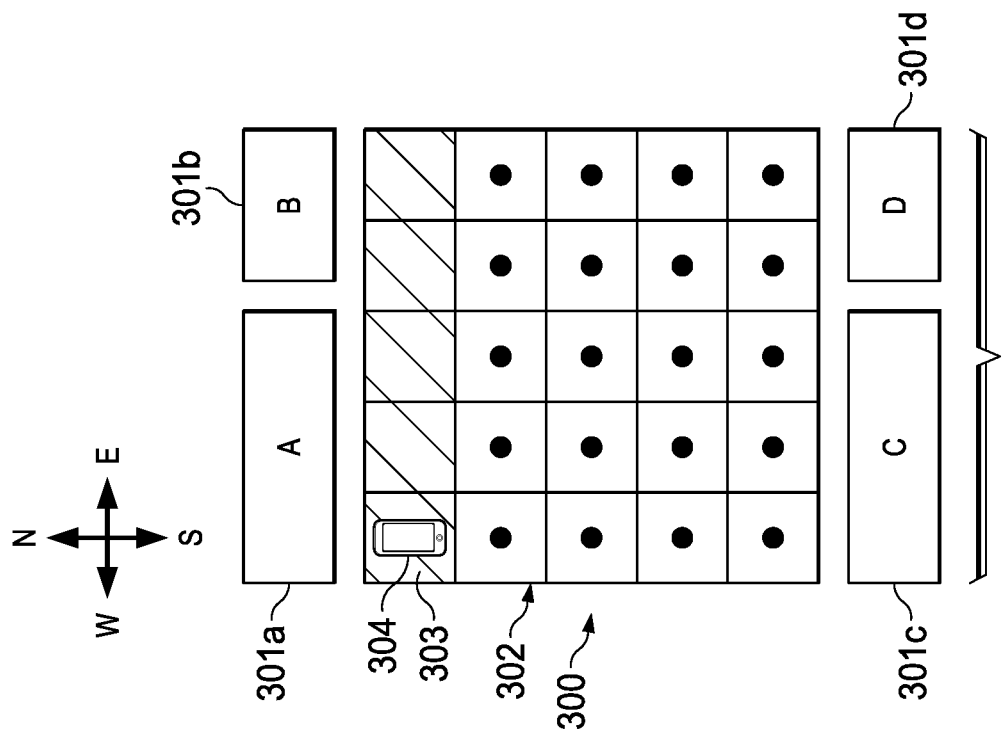
FIG. 3A is a top plan view of an example 3D candidate position grid, according to an embodiment.

FIG. 3A is a top plan view of an example 2D CPG, according to an embodiment. In the example shown, area of interest 300 (e.g., an urban street) is located between buildings 301a (A), 301b (B) and buildings 301c (C) and 301d (D). The across-street direction is North to South and the down-street direction is East to West. This example street layout suggests that shadowing in the across-street direction since satellite visibility will be greater down-street to the obstructed LOS to satellites in the down-street direction.

A 5×5 2D CPG 302 is overlaid on street 300 as shown, where the center of each cell in 2D CPG 302 is a candidate position indicated by a black dot. The horizontal spacing between the candidate positions is, for example, 3 meters. Each candidate position is associated with coordinates in a geodetic or local-level coordinate system. In this example, each candidate position has set of coordinates in the ENU coordinate system. The actual location of mobile device 304 for this example is candidate position 303, which is located in the top left corner of 2D CPG 302, abutting building 301, as shown in FIG. 3A. Therefore, the candidate position 303 would have an ENU position coordinate of P (e, n, u), where "e" is the Easting component, "n" is the Northing component and "u" is the up component or altitude.

In the example shown, all of the candidate positions in 2D CPG 302 have been extended in the vertical direction by a specified vertical spacing (e.g., 3 meters). Assuming that the vertical and horizontal spacing are the same, the resulting 3D CPG 305 is shown in FIG. 3B, where each layer is associated with a different altitude and is equal to the sum of the vertical spaces of the underlying layers. For example, the first layer is associated with a first altitude (Alt 1) above street level, the second layer is associated with a second altitude (Alt 2) above street and so forth, where Alt 2 is a higher altitude than Alt 1. In this example, because mobile device 304 is located on the $4^{th}$ layer the altitude estimate of mobile device 304 is 12 meters above street level.

As discussed in further detail below, the goal of the positioning algorithm is to select the candidate position P (e, n, u) from all the other candidate positions in 3D CPG 305. By using a 3D CPG model rather than a 2D CPG model, additional candidate positions can be evaluated by the positioning algorithm that take into account changing satellite visibility at different altitudes at the same position, e.g., the same northing and easting coordinates. In 3D CPG 305, the "u" component for each candidate position set equal the altitude estimate of the layer where the candidate position is located. Using the example, above the ENU coordinates of candidate position 303 is P ($e_{303}$, $n_{303}$, $alt_5$).

Depending on the desired altitude accuracy, a 3D CPG, may require many layers and the number of candidate positions to be processed by the positioning algorithm effectively increases on the order of O(N), where N is the number of layers. To reduce this increased computation, only a subset of the candidate positions in the 2D CPG 302 are vertically extended. In the example shown, only the candidate positions that are abutting buildings 301*a* and 301*b* (identified by diagonal fill patterns) are extended because those particular candidate locations are the most likely to yield floor lower bounds. That is, there is a higher likelihood that a position fix above street level will be found at those candidate positions. The subset of vertically extended candidate positions is processed together with the 2D CPG candidate positions to generate the position fix for mobile device 304.

Figure 3C:
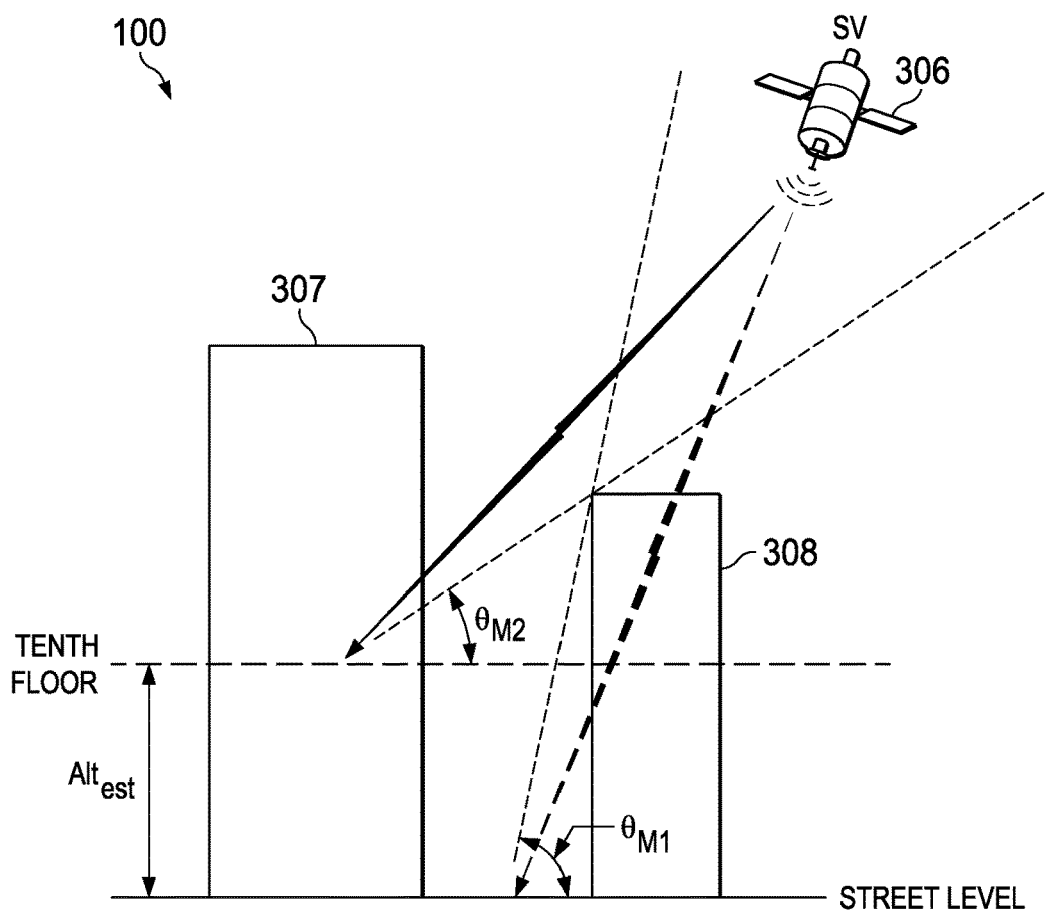
FIG. 3C illustrates satellite visibility as a function of altitude of the observation point, according to an embodiment.

FIG. 3C illustrates satellite visibility as a function of altitude of the user's observation point, according to an embodiment. If the user's observation point for testing satellite visibility is at a higher altitude, the satellite visibility may change. In the example shown, the elevation mask angle $\theta_{M1}$ calculated at street level is greater than the elevation mask angle $\theta_{M2}$ calculated on the $10^{th}$ floor of building 307. Therefore, the LOS signal from satellite 306 is not visible at the street level due to the shadow of building 308 but is visible at the $10^{th}$ floor of building 307.

Example Satellite Visibility Prediction and Scoring

After 3D CPG 305 is generated, satellite visibility is predicted at each candidate position in the 3D CPG grid. For example, at each candidate position, each satellite's elevation is compared with the building boundary elevation at the same azimuth. The satellite is predicted to be visible if the satellite elevation angle is greater than the elevation mask angle of the building boundary. To facilitate this calculation, building boundaries can be generated for each candidate location as azimuth-elevation pairs using a 3D city mode. In an embodiment, a 3D diffraction zone can be modeled for building boundaries both horizontally and vertically by modelling the buildings as lower and narrower than their actual height and width. An example of the building boundary method is described in Wang et. al, "GNSS Shadow Matching: Optimized Scoring Scheme," Navigation: Journal of The Institute of Navigation, Vol. 60, No. 3 (Fall 2013).

Figure 4:
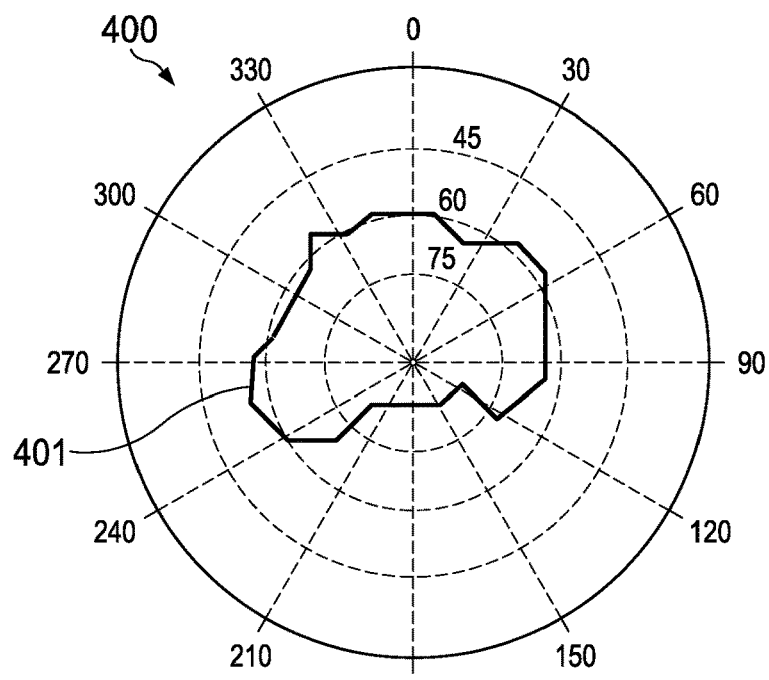
FIG. 4 is a sky plot illustrating a building boundary as azimuth-elevation pairs, according to an embodiment.

FIG. 4 is a sky plot 400 illustrating an example building boundaries 401 as azimuth-elevation pairs, where the center of the sky plot corresponds to a 90° elevation or normal incidence. Building boundaries 401 are presented from a GNSS user's perspective, with building edges determined for each azimuth (from 0° to 360°) as a series of elevation angles. In an embodiment, building boundaries 401 can be computed in real-time by the mobile device or by an online service that sends building boundaries 401 to the mobile device in map or 3D CPG tiles.

Referring back to FIG. 2, after satellite visibility prediction is performed at each candidate position in the 3D CPG, satellite visibility scoring is performed at each candidate position. The similarity between satellite visibility predictions and satellite visibility observations can be scored using any desire scoring scheme. Wang et al., for example, discloses a scoring scheme that uses a scoring matrix. In a first stage of score calculation, at each candidate location, each satellite above the elevation mask angle is given a score, calculated based on the predicted and observed visibility using a scoring scheme. In a second stage of the score calculation, a position scoring function evaluates the overall degree of match between the predicted and observed satellite visibility for each possible position of the mobile device, given by Equation [1]:

$$f_{pos}(p) = \sum_{i=1}^{m} f_{sat}(s, p, SS), \quad [1]$$

where $f_{pos}(p)$ is the position score for candidate position, $f_{sat}(s,p)$ is the score of the satellite s at candidate position p, m is the number of satellites above the elevation mask angle, and SS is the scoring scheme which defines a score based on predicted and observed satellite visibility. At the end of the second step, each candidate position will have a score to represent the degree to which the score matches the observed satellite visibility, and how likely it is that each candidate position is close to the actual location of the mobile device.

In an embodiment using a score matrix as described by Wang et. al., a weak signal is deemed likely to be reflected or diffracted, and is given a lower weight compared to a strong signal. In an embodiment, a 3×3 score matrix is used.

| Score Matrix | | |
|---|---|---|
| 1 | 1 | 0 |
| 0.5 | 2 | 0.5 |
| 0 | 1 | 1 |

The rows of the score matrix above represent observations: row 1: not tracked, row 2: weak signal (low SNR) and row 3: strong signal (high SNR). The columns of the score matrix represent predictions: column 1: invisible, column 2: diffracted and column 3: visible. Accordingly, a satellite that is not tracked and is predicted to be invisible receives a score of 1, and a satellite that is tracked and is predicted to be visible receives a score of 1. A satellite that provides a weak signal and is invisible and is predicted to be diffracted receives a score of 2, and so forth. The values in the matrix are examples only, and in practice can change based on the actual signal characteristics in the environment based on survey data, 3D building models and the type of GNSS hardware used.

The next step of the positioning algorithm is to generate a positioning solution using the scores from each candidate position. Any desired positioning algorithm can be used in this step, including but not limited to: pattern matching, least squares, Bayes inference, k-weighted nearest neighbors, particle filters and Kalman filters.

Wang et al. discloses using a method similar to k-nearest neighbors to estimate the improved position fix, by averaging the Northing and Easting components of candidate positions sharing the same scores. However, to accommodate the use of a 3D CPG, the method is modified to include averaging of the Up component according to Equations [2]-[4]:

$$N_a = \frac{1}{l}\sum_{i=1}^{l} N_i, \quad [2]$$

$$E_a = \frac{1}{l}\sum_{i=1}^{l} E_i, \quad [3]$$

$$U_a = \frac{1}{l}\sum_{i=1}^{l} Alt_{est\_i}, \quad [4]$$

where $N_i$, $E_i$, $U_i$ are, respectively, the northing, easting and up coordinates of the ith high-scoring candidate positions in the ENU coordinate system, and where $l$ varies from epoch to epoch depending on how many candidate positions share the highest score. Note that $U_i$ is the estimated altitudes $Alt_{est\_i}$ taken from a 3D CPG model described above in reference to FIGS. 3A and 3B.

Based on Equations [2]-[4], location analyzer 202 produces an improved position fix $P_{est2}$ ($E_a$, $N_a$, $U_a$), which is more accurate than the initial position fix $P_{est1}$ because it includes a more accurate altitude fix. In some cases, the initial position fix may have an initial altitude fix (e.g., a non-zero Up component). In such cases, the initial altitude fix is assumed to have a large offset error, and thus can be replaced with either the altitude estimate taken from the 3D CPG, if one is available for the candidate position, or zero if an altitude estimate is not available for the candidate position. Replacing the initial altitude estimate with zero ensures that the offset error from the initial altitude fix does get included in the scoring. If the improved position fix $P_{est2}$ has an estimated altitude below a threshold value (e.g., zero), location analyzer 202 assumes that the mobile device is located outdoors and outputs a "nil" value to floor analyzer 203. The "nil" value indicates that there is no floor information because the improved position fix is assumed to be outdoors. If, however, the improved position fix $P_{est2}$ includes an altitude estimate (e.g., 12 meters), location analyzer 202 assumes that the mobile device is located indoors and proceeds to identify the building where the mobile device is most likely located.

To identify candidate buildings where the mobile device is most likely located, in an embodiment, in an embodiment location analyzer 202 determines the distance between the improved position fix $P_{est2}$ and the locations of each building that is abutting the footprint of the 3D CPG, such as the candidate positions (including candidate position 303) that are shaded in FIG. 3A. In an embodiment, the building determined to be nearest to the improved position fix $P_{est2}$ can be selected as the building where the mobile device is most likely located. In our example, this would be building 301a (A).

In some cases, however, there may be two or more candidate buildings that are about the same distance from $P_{est2}$. To address this scenario, the candidate buildings can be scored based on additional information. For example, the score can be a sum of weighted factors, where the sum of the weights equals one. An example factor can be whether the candidate building is associated with the mobile device or the user of the mobile device. For example, the mobile device may cache a history of frequented locations by the user, which can be used to adjust the score. If the candidate building is a frequented location by the user, the weight of this factor can be higher. Another example factor can be based on pedestrian dead reckoning (PDR). For example, if a history of device motion is stored on the mobile device, that motion may reveal that the device is stationary (e.g., based on acceleration data) outside a particular building for a period of time which may suggest the user entered that building. Similarly, a velocity vector directed towards a candidate building, followed by a sudden de-acceleration reading, indicates the user may have entered the building and is assigned an appropriate weight. Another example factor can be building information. For example, the name of the building or an occupancy map could indicate that the building is not an office or business but is, for example, a warehouse or some other structure that would likely not be occupied by pedestrians or the particular user if user profile information is available. Also, a POI database can be searched to determine the hours of operation of a candidate building based on the assumption that if the building is closed, then the mobile device is less likely not located in that candidate building. In an embodiment, the 3D CPG can be extended into the footprints of abutting buildings to assist in identifying the correct building where the mobile device is most likely located.

After a candidate building is selected as the most likely indoor environment of the mobile device, a building identifier (ID) is sent to floor analyzer 203, which can be used by floor analyzer 203 to query building data database 208 for structural data (e.g., floor plan, blueprints, POI data, map data) using the building ID. The structural information can be used by floor analyzer 203 to determine a floor LB based on the estimated altitude $Alt_{est}$ provided by location analyzer 202. In an embodiment, the building height can be divided by the number floors to give an estimated vertical spacing between floors, and that vertical spacing can be compared with the estimated altitude to determine the floor LB. For example, if the architectural height of the building is 50 meters, and the building has 5 floors, then the vertical floor spacing is estimated to be 10 meters. If the estimated altitude is 35 meters, then floor analyzer 203 would designate the floor LB to be the third floor of the building. That means the likely location of the mobile device is between the third floor and the roof top of the building.

Floor analyzer 203 can provide the floor LB to map display generator 204, which overlays the floor LB information on a map presented in a navigation application or any other application that requests a position fix. For example, if a E911 call is placed on the mobile device the improved position estimate $P_{est2}$, building ID, and floor LB can be sent to an E911 dispatch center, where it can be used by first responders to navigate to the emergency location faster and potentially save a life.

In an embodiment, where the mobile device includes an altitude sensor such as a barometer, the estimated altitude from location analyzer 202 can be used by barometer calibrator 205 to calibrate the barometer data (e.g., remove the offset error). The calibrated barometer data can then be used by location estimator 201 to improve position fixes. For example, the calibrated barometer measurement can be included in an observation vector by a Kalman filter or other state estimator to improve position and velocity measurements. In an embodiment, the barometer bias can be one of the estimated states. In another embodiment, the estimated altitude determined by location analyzer can be feed directly to location estimator 201 where it can be used as an observation in the state estimator or filter to improve altitude estimates.

Example Process

Figure 5:
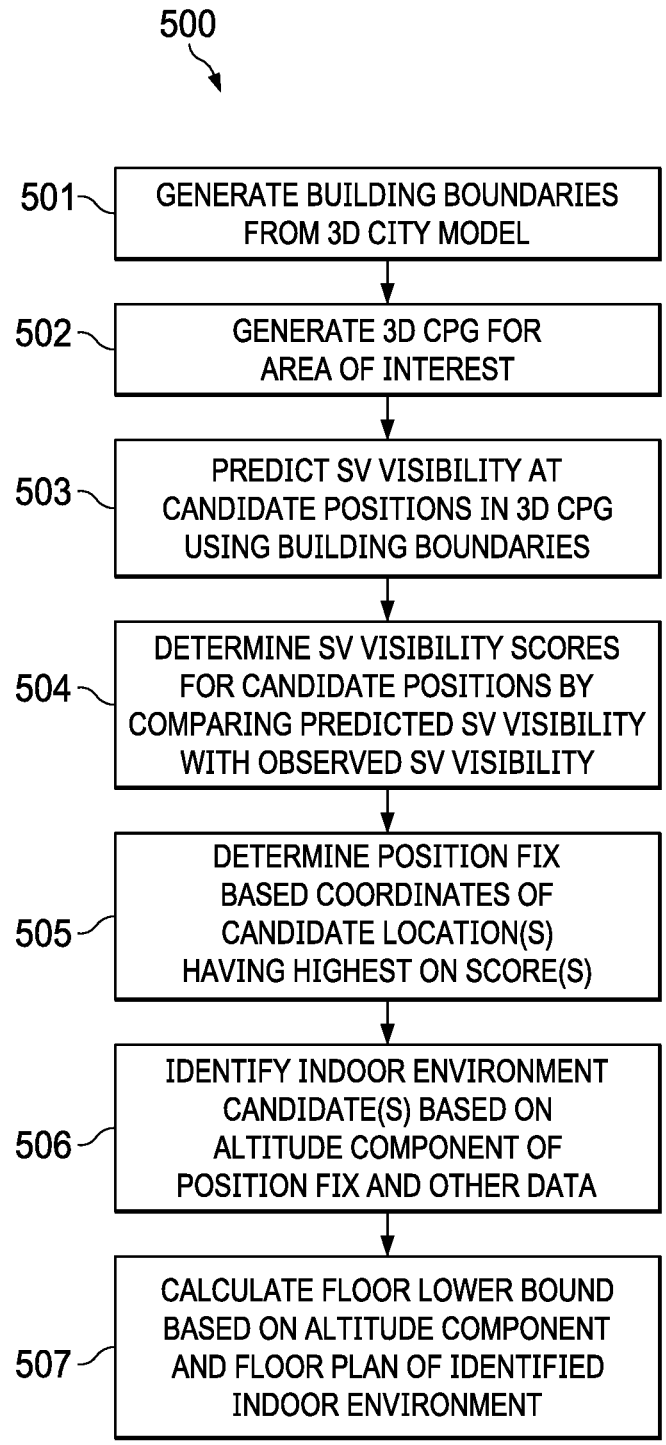
FIG. 5 is a flow diagram of an example process of using 3D city models and shadow mapping to improve altitude fixes in urban environments, according to an embodiment.

FIG. 5 is a flow diagram of an example process 500 of using 3D city models and shadow mapping to improve position fixes in urban environments, according to an embodiment. Process 500 can be implemented by architecture 600, as described in reference to FIG. 6.

Process 500 can begin by generating building boundaries from a 3D city model (501). The building boundaries can be generated for each candidate point in a 2D CPG. In an embodiment, azimuth-elevation pairs are generated from 3D building model data, such as the height and location of the buildings. The building boundaries can be pre-computed and stored on a server and delivered in, for example, map tiles for the area of interest. The building boundaries can also be calculated on the fly.

Process 500 can continue by generating a 3D CPG (502). In an embodiment, an initial position fix can be used to determine the location and footprint of 2D CPG, which can be any desired size or shape. The initial position fix can be determined using a variety of positioning technologies, including but not limited to: GNSS, wireless network, cell tower and dead reckoning technologies. In an embodiment, the placement of the 2D CPG can be determined based on satellite geometry. A 3D CPG can be generated from the 2D CPG by vertically extending at least some of the candidate positions in the 2D CPG. The result of this step is a volume having multiple layers of 2D CPGs. The layers can be separated by any desired vertical space. In an embodiment, only the candidate points that are abutting buildings or other objects are vertically extended to reduce computation time.

Process 500 can continue by predicting satellite visibility at candidate points in the 3D CPG using the building boundaries (503). For each candidate position, each satellite's elevation angle is compared with the building boundary elevation mask angle at the same azimuth. The satellite is predicted to be visible if the satellite is above the building boundary.

Process 500 can continue by determining satellite visibility scores for each candidate by comparing predicted satellite visibility and observed satellite visibility (504). For example, the similarity between predictions and observations of satellite visibility are evaluated. The candidate positions with the better matches are weighted higher in the positioning algorithm. In an embodiment, each candidate position is scored based on whether there is a match or not between the predicted and observed satellite visibility. The coordinates of the candidate position with the highest score represents the improved position fix (505). If more than one candidate position shares the same highest score, than the position coordinates of those candidate positions can be averaged using, for example, a k nearest neighbor algorithm. Other scoring schemes are also possible.

Process 500 can continue by identifying the most likely indoor location based on the altitude component of the position fix and other data (506). If a candidate position with the highest score includes an altitude component, then it is assumed that the actual location of the mobile device is inside a building. Based on 3D building model data, the buildings that are abutting the position fix become candidate buildings. In an embodiment, a scoring scheme can be used to determine one of a plurality of candidate buildings as being the most likely to be where the mobile device is operating. The candidate building with the highest score is determined to be the building where the mobile device is actually located. The scores can be bases on a sum of weighted factors where the sum of the weights equal 1.

Process 500 can continue by determining a floor LB based on an estimated altitude associated with the candidate location having the highest score and structural data for the identified indoor location (507). After a building is identified as the most likely location of the mobile device, a floor LB can be determined based on the estimated altitude component taken from the 3D CPG and the structural data.

Other optional steps can include but are not limited to calibrating a barometer sensor using the estimated altitude and including the estimated altitude as an observation in a state estimator or filter (e.g., a Kalman filter, particle filter, least squares estimator) to improve the position fix and velocity estimated by the state estimator or filter. Also, an access point in the candidate building can be tagged as being associated with an improved altitude component to be used for subsequent WiFi position fixes.

Exemplary Mobile Device Architecture

Figure 6:
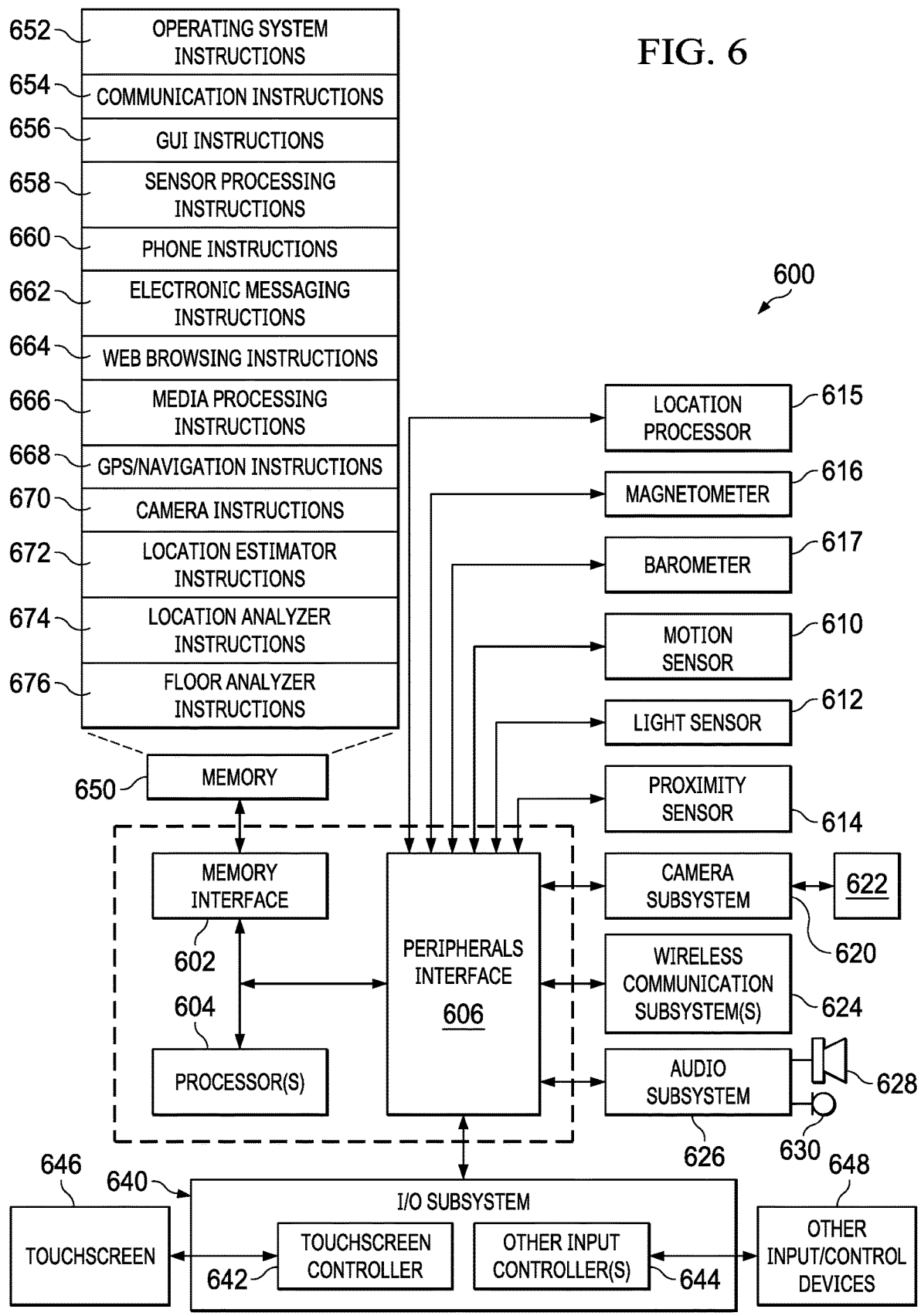
FIG. 6 illustrates an example device architecture of a mobile device implementing the features and operations described in reference to FIGS. 1-5.

FIG. 6 illustrates an example device architecture 600 of a mobile device implementing the features and operations described in reference to FIGS. 1-5. Architecture 600 can include memory interface 602, one or more data processors, image processors and/or application processors 604 and peripherals interface 606. Memory interface 602, one or more processors 604 and/or peripherals interface 606 can be separate components or can be integrated in one or more integrated circuits. The various components in architecture 600 can be coupled by one or more communication buses or signal lines.

Sensors, devices and subsystems can be coupled to peripherals interface 606 to facilitate multiple functionalities. For example, one or more motion sensors 610, light sensor 612 and proximity sensor 614 can be coupled to peripherals interface 606 to facilitate motion sensing (e.g., acceleration, rotation rates), lighting and proximity functions of the mobile device. Location processor 615 can be connected to peripherals interface 606 to provide geopositioning. In some implementations, location processor 615 can be a GNSS receiver, such as the Global Positioning System (GPS). Electronic magnetometer 616 (e.g., an integrated circuit chip) can also be connected to peripherals interface 606 to provide data that can be used to determine the direction of magnetic North. Electronic magnetometer 616 can provide data to an electronic compass application. Motion sensor(s) 610 can include one or more accelerometers and/or gyros configured to determine change of speed and direction of movement of the mobile device. Sensor data or signals from motion sensors can be processed by a separate processor, co-processor or FPGA that is independent of processors 604. Barometer 617 can be configured to measure atmospheric pressure around the mobile device.

Camera subsystem 620 and an optical sensor 622, e.g., a charged coupled device (CCD) or a complementary metal-oxide semiconductor (CMOS) optical sensor, can be utilized to facilitate camera functions, such as capturing photographs and recording video clips.

Communication functions can be facilitated through one or more wireless communication subsystems 624, which can include radio frequency (RF) receivers and transmitters (or transceivers) and/or optical (e.g., infrared) receivers and transmitters. The specific design and implementation of the communication subsystem 624 can depend on the communication network(s) over which a mobile device is intended to operate. For example, architecture 600 can include communication subsystems 624 designed to operate over a GSM network, a GPRS network, an EDGE network, a Wi-Fi™ or WiMax™ network and a Bluetooth™ network. In particular, the wireless communication subsystems 624 can include hosting protocols, such that the mobile device can be configured as a base station for other wireless devices.

Audio subsystem 626 can be coupled to a speaker 628 and a microphone 630 to facilitate voice-enabled functions, such as voice recognition, voice replication, digital recording and telephony functions. Audio subsystem 626 can be configured to receive voice commands from the user.

I/O subsystem 640 can include touch surface controller 642 and/or other input controller(s) 644. Touch surface controller 642 can be coupled to a touch surface 646 or pad. Touch surface 646 and touch surface controller 642 can, for example, detect contact and movement or break thereof using any of a plurality of touch sensitivity technologies, including but not limited to capacitive, resistive, infrared and surface acoustic wave technologies, as well as other proximity sensor arrays or other elements for determining one or more points of contact with touch surface 646. Touch surface 646 can include, for example, a touch screen. I/O subsystem 640 can include a haptic engine or device for providing haptic feedback (e.g., vibration) in response to commands from a processor.

Other input controller(s) 644 can be coupled to other input/control devices 648, such as one or more buttons, rocker switches, thumb-wheel, infrared port, USB port and/or a pointer device such as a stylus. The one or more buttons (not shown) can include an up/down button for volume control of speaker 628 and/or microphone 630. Touch surface 646 or other controllers 644 (e.g., a button) can include, or be coupled to, fingerprint identification circuitry for use with a fingerprint authentication application to authenticate a user based on their fingerprint(s).

In one implementation, a pressing of the button for a first duration may disengage a lock of the touch surface 646; and a pressing of the button for a second duration that is longer than the first duration may turn power to the mobile device on or off. The user may be able to customize a functionality of one or more of the buttons. The touch surface 646 can, for example, also be used to implement virtual or soft buttons and/or a virtual touch keyboard.

In some implementations, the mobile device can present recorded audio and/or video files, such as MP3, AAC and MPEG files. In some implementations, the mobile device can include the functionality of an MP3 player. Other input/output and control devices can also be used.

Memory interface 602 can be coupled to memory 650. Memory 650 can include high-speed random access memory and/or non-volatile memory, such as one or more magnetic disk storage devices, one or more optical storage devices and/or flash memory (e.g., NAND, NOR). Memory 650 can store operating system 652, such as iOS, Darwin, RTXC, LINUX, UNIX, OS X, WINDOWS, or an embedded operating system such as VxWorks. Operating system 652 may include instructions for handling basic system services and for performing hardware dependent tasks. In some implementations, operating system 652 can include a kernel (e.g., UNIX kernel).

Memory 650 may also store communication instructions 654 to facilitate communicating with one or more additional devices, one or more computers and/or one or more servers, such as, for example, instructions for implementing a software stack for wired or wireless communications with other devices. Memory 650 may include graphical user interface instructions 656 to facilitate graphic user interface processing; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GNSS/Location instructions 668 to facilitate generic GNSS and location-related processes and instructions; and camera instructions 670 to facilitate camera-related processes and functions. Memory 650 further includes location estimator instructions 672, location analyzer instructions 674 and floor analyzer instructions 676 for performing the features and processes described in reference to FIGS. 1-5. The memory 650 may also store other software instructions (not shown), such as security instructions, web video instructions to facilitate web video-related processes and functions and/or web shopping instructions to facilitate web shopping-related processes and functions. In some implementations, the media processing instructions 666 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. Memory 650 can include additional instructions or fewer instructions. Furthermore, various functions of the mobile device may be implemented in hardware and/or in software, including in one or more signal processing and/or application specific integrated circuits.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., SWIFT, Objective-C, C #, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random-access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor or a retina display device for displaying information to the user. The computer can have a touch surface input device (e.g., a touch screen) or a keyboard and a pointing device such as a mouse or a trackball by which the user can provide input to the computer. The computer can have a voice input device for receiving voice commands from the user.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

What is claimed is:

1. A method comprising:
   receiving, by a GNSS receiver of a mobile device, GNSS signals at a current location of the mobile device;
   generating, by a processor of the mobile device, a set of three-dimensional (3D) candidate positions in a geographic area of interest, the geographical area of interest including an estimated location of the mobile device based on the received GNSS signals, wherein generating the set of 3D candidate positions comprises:
      generating a two-dimensional (2D) candidate position grid (CPG) comprising a set of candidate locations,
      determining that a structure is positioned in the geographic area of interest, and
      responsive to determining that a structure is positioned in the geographic area of interest, vertically extending the 2D CPG with respect to a first subset of the candidate locations of the 2D CPG that abut the structure, and maintaining the 2D CPG with respect to a second subset of the candidate locations of the 2D CPG that do not abut the structure;

predicting, by the processor, global navigation satellite system (GNSS) signal visibility at selected ones of the 3D candidate positions based on one or more physical obstructions in the geographic area of interest;
determining, by the processor, observed satellite visibility based on the received GNSS signals;
comparing the predicted satellite visibility with the observed satellite visibility;
determining, by the processor, a position fix based on a result of the comparing;
determining, by the processor, an indoor environment where the mobile device is located based at least on an altitude component of the position fix;
obtaining, by the processor, structural data for the identified indoor environment; and
determining, by the processor, a floor lower bound for the current location of the mobile device based on the altitude component and the structural data.

2. The method of claim 1, further comprising:
calibrating an output of a barometer sensor of the mobile device using the altitude component of the position fix.

3. The method of claim 2, comprising:
using the calibrated altitude component as a measurement observation in a state estimator or filter to correct a predicted position or velocity state of the mobile device.

4. The method of claim 3, further comprising:
tagging one or more wireless access points with the position fix.

5. The method of claim 1, wherein predicting GNSS signal visibility at selected ones of the 3D candidate positions further comprises:
calculating, for each candidate position, elevation angles defining building boundaries in the area of interest using 3D building models, each calculated building boundary elevation angle associated with an azimuth angle at which the elevation was calculated;
calculating observed satellite elevation angles using GNSS data included in the GNSS signals;
comparing each observed satellite elevation angle with each building boundary elevation angle at the same azimuth angle; and
predicting GNSS signal availability based at least in part on the comparing.

6. The method of claim 1, wherein comparing the predicted satellite visibility with the observed satellite visibility further comprises:
calculating a score for each candidate position based on matches of the predicted and observed satellite visibility; and
determining the position fix to be the coordinates of a highest scoring candidate position.

7. The method of claim 1, wherein the 3D candidate positions are included in a 3D candidate position grid (CPG) that is overlaid on at least a portion of the area of interest, wherein at least one 3D candidate position is included in a different layer of the 3D CPG than the other 3D candidate positions.

8. The method of claim 1, wherein determining a floor lower bound for the identified indoor environment based on the altitude component and the structural data further comprises:
mapping the altitude component to floor locations in the building according to the structural data; and
determining the floor lower bound as the floor that is located immediately below the mapped altitude component.

9. The method of claim 1, wherein identifying an indoor environment where the mobile device is most likely located further comprises:
identifying two or more candidate indoor environments based on the altitude component;
scoring each candidate indoor environment based on a sum of weighted factors, where each factor provides a hint of the mobile device location based on at least one of frequent locations of the mobile device, inertial sensor data or operating hours for the indoor environment.

10. A system comprising:
one or more processors;
memory coupled to the one or more processors and configured to store instructions, which, when executed by the one or more processors, cause the one or more processors to perform operations comprising:
receiving GNSS signals at a current location of a mobile device;
generating a set of three-dimensional (3D) candidate positions in a geographic area of interest, the geographical area of interest including an estimated location of the mobile device based on the received GNSS signals, wherein generating the set of 3D candidate positions comprises:
generating a two-dimensional (2D) candidate position grid (CPG) comprising a set of candidate locations,
determining that a structure is positioned in the geographic area of interest, and
responsive to determining that a structure is positioned in the geographic area of interest,
vertically extending the 2D CPG with respect to a first subset of the candidate locations of the 2D CPG that abut the structure, and maintaining the 2D CPG with respect to a second subset of the candidate locations of the 2D CPG that do not abut the structure;
predicting global navigation satellite system (GNSS) signal visibility at selected ones of the 3D candidate positions based on one or more physical obstructions in the geographic area of interest;
determining observed satellite visibility based on the received GNSS signals;
comparing the predicted satellite visibility with the observed satellite visibility;
determining a position fix based on a result of the comparing;
determining an indoor environment where the mobile device is located based at least on an altitude component of the position fix;
obtaining structural data for the identified indoor environment; and
determining a floor lower bound for the current location of the mobile device based on the altitude component and the structural data.

11. The system of claim 10, wherein the operations further comprise:
calibrating an output of a barometer sensor of the mobile device using the altitude component of the position fix.

12. The system of claim 11, wherein the operations further comprise:
using the calibrated altitude component as a measurement observation in a state estimator or filter to correct a predicted position or velocity state of the mobile device.

13. The system of claim 10, wherein predicting GNSS signal visibility at selected ones of the 3D candidate positions further comprises:

- calculating, for each candidate position, elevation angles defining building boundaries in the area of interest using 3D building models, each calculated building boundary elevation angle associated with an azimuth angle at which the elevation was calculated;
- calculating observed satellite elevation angles using GNSS data included in the GNSS signals;
- comparing each observed satellite elevation angle with each building boundary elevation angle at the same azimuth angle; and
- predicting GNSS signal availability based at least in part on the comparing.

14. The system of claim 10, wherein comparing the predicted satellite visibility with the observed satellite visibility further comprises:

- calculating a score for each candidate position based on matches of the predicted and observed satellite visibility; and
- determining the position fix to be the coordinates of a highest scoring candidate position.

15. The system of claim 10, wherein the 3D candidate positions are included in a 3D candidate position grid (CPG) that is overlaid on at least a portion of the area of interest, wherein at least one 3D candidate position is included in a different layer of the 3D CPG than the other 3D candidate positions.

16. The system of claim 10, wherein determining a floor lower bound for the identified indoor environment based on the altitude component and the structural data further comprises:

- mapping the altitude component to floor locations in the building according to the structural data; and
- determining the floor lower bound as the floor that is located immediately below the mapped altitude component.

17. The system of claim 10, wherein identifying an indoor environment where the mobile device is most likely located further comprises:

- identifying two or more candidate indoor environments based on the altitude component;
- scoring each candidate indoor environment based on a sum of weighted factors, where each factor provides a hint of the mobile device location based on at least one of frequent locations of the mobile device, inertial sensor data or operating hours for the indoor environment.

18. The system of claim 10, the operations further comprising:

- tagging one or more wireless access points with the position fix.

* * * * *